United States Patent
Hampton

(10) Patent No.: US 11,548,649 B2
(45) Date of Patent: Jan. 10, 2023

(54) AIRCRAFT ESCAPE SYSTEM AND EJECTION SEAT SEQUENCER FOR EJECTION SYSTEMS

(71) Applicant: AMI Industries, Inc., Colorado Springs, CO (US)

(72) Inventor: John Hampton, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 96 days.

(21) Appl. No.: 17/125,494

(22) Filed: Dec. 17, 2020

(65) Prior Publication Data

US 2022/0194606 A1 Jun. 23, 2022

(51) Int. Cl.
*B64D 25/10* (2006.01)
*B64C 1/32* (2006.01)

(52) U.S. Cl.
CPC ............... *B64D 25/10* (2013.01); *B64C 1/32* (2013.01)

(58) Field of Classification Search
CPC ............ B64D 25/08; B64D 25/10; B64C 1/32
See application file for complete search history.

(56) References Cited

U.S. PATENT DOCUMENTS

| | | | | |
|---|---|---|---|---|
| 3,669,388 A * | 6/1972 | Van Kreuningen | ... | B64D 25/00 244/138 R |
| 4,673,147 A * | 6/1987 | Solomonides | ... | B64D 25/10 244/122 A |
| 4,792,903 A * | 12/1988 | Peck | ... | B64D 25/10 244/122 A |
| 4,846,421 A * | 7/1989 | Trikha | ... | B64D 25/10 244/141 |
| 4,911,382 A * | 3/1990 | Aronne | ... | B64D 25/10 307/118 |
| 5,222,695 A * | 6/1993 | Lake | ... | B64D 25/10 244/122 AE |
| 5,525,847 A * | 6/1996 | Aronne | ... | B64D 25/10 307/43 |
| 6,315,245 B1 * | 11/2001 | Ruff | ... | B64D 25/02 244/122 AG |
| 6,845,947 B1 | 1/2005 | Reese, Jr. et al. | | |
| 2005/0230545 A1 * | 10/2005 | Ayoub | ... | B64D 25/10 244/122 A |

FOREIGN PATENT DOCUMENTS

| | | |
|---|---|---|
| EP | 0127246 | 12/1984 |
| EP | 0256425 | 2/1988 |
| GB | 2120612 | 12/1983 |
| GB | 2595571 | 12/2021 |

OTHER PUBLICATIONS

UK Intellectual Property Office; UK Search Report dated Jun. 13, 2022 in application No. GB2118431.2.

\* cited by examiner

*Primary Examiner* — Richard G Davis
(74) *Attorney, Agent, or Firm* — Snell & Wilmer L.L.P.

(57) ABSTRACT

An article of manufacture may include a tangible, non-transitory computer-readable storage medium having instructions stored thereon for controlling deployment of aircraft escape and ejection seat subsystems. The instructions, in response to execution by a sequencer, cause the sequencer to perform operations, which may comprise receiving, by the sequencer, a power input; sending, by the sequencer, a first deploy signal to a first aircraft escape subsystem; and sending, by the sequencer, a second deploy signal to a first ejection seat subsystem.

20 Claims, 5 Drawing Sheets

AIRCRAFT ESCAPE SYSTEM AND EJECTION SEAT SEQUENCER FOR EJECTION SYSTEMS

FIELD

The present disclosure relates to ejection systems and, more particularly, to a sequencer for an ejection system.

BACKGROUND

Ejection systems are designed to expel ejection seats and their occupants from an aircraft. Typical ejection systems include an aircraft escape sequencing system and an ejection seat sequencer system. The aircraft escape sequencing system generally controls and deploys the canopy removal system and the seat catapult. The ejection seat sequencer system generally controls the timing sequence and deployment of the ejection seat subsystems (e.g., the drogue parachute deployment, the main parachute deployment, the aircrew restraint release, etc.). Using two separate sequencing systems tends to increase weight, part count, and costs.

SUMMARY

Disclosed herein, in accordance with various embodiments, is an article of manufacture including a tangible, non-transitory computer-readable storage medium having instructions stored thereon for controlling deployment of aircraft escape and ejection seat subsystems. The instructions, in response to execution by a sequencer, cause the sequencer to perform operations, which may comprise receiving, by the sequencer, a power input; sending, by the sequencer, a first deploy signal to a first aircraft escape subsystem; and sending, by the sequencer, a second deploy signal to a first ejection seat subsystem.

In various embodiments, the first aircraft escape subsystem may comprise at least one of a canopy removal system or a seat catapult system. In various embodiments, the first ejection seat subsystem may comprise at least one of a drogue parachute assembly, a main parachute assembly, a restraint release assembly, or an inertia reel assembly.

In various embodiments, the operations may further comprise sending, by the sequencer, a third deploy signal to a second aircraft escape subsystem. The first aircraft escape subsystem may comprise a canopy removal system and the second aircraft escape subsystem may comprise a seat catapult system.

In various embodiments, the operations may further comprise determining, by the sequencer, a first electrical connector is disconnected from a second electrical connector; and sending, by the sequencer, the third deploy signal in response to determining the first electrical connector is disconnected from the second electrical connector. The first electrical connector may be electrically coupled to the canopy removal system and the second electrical connector may be electrically coupled to the sequencer.

In various embodiments, the sequencer may be configured to send the third deploy signal to the seat catapult system a predetermined time delay after sending the first deploy signal to the canopy removal system.

In various embodiments, the operations may further comprise sending, by the sequencer, a fourth deploy signal to a second ejection seat subsystem after sending the second deploy signal. The sequencer may be configured to send the second deploy signal after sending the third deploy signal and determining.

An ejection system is also disclosed herein. In accordance with various embodiments, the ejection system may comprise a sequencer, a canopy removal system in communication with the sequencer and a power source electrically coupled to the sequencer. A seat catapult system may be in communication with the sequencer. A first ejection seat subsystem may be in communication with the sequencer. A tangible, non-transitory computer-readable storage medium may have instructions stored thereon that, in response to execution by the sequencer, cause the sequencer to perform operations, which may comprise: receiving, by the sequencer, a power input from the power source; sending, by the sequencer, a first deploy signal to the canopy removal system; sending, by the sequencer, a second deploy signal to the seat catapult system; and sending, by the sequencer, a third deploy signal to the first ejection seat subsystem.

In various embodiments, a handle may be operable coupled to the power source. The power source may be configured to output the power input to the sequencer in response to actuation of the handle.

In various embodiments, a first wire bundle may be electrically coupled to the canopy removal system, and a second wire bundle may be electrically coupled to the sequencer. In various embodiments, the operations may further comprise determining, by the sequencer, a first electrical connector of the first wire bundle is disconnected from a second electrical connector of the second wire bundle; and sending, by the sequencer, the second deploy signal in response to determining the first electrical connector is disconnected from the second electrical connector.

In various embodiments, a test port may be electrically coupled to the sequencer. In various embodiments, the sequencer may be configured to send the second deploy signal a preset time delay after sending the first deploy signal to the canopy removal system.

In various embodiments, the ejection system may further comprise an ejection seat. The sequencer, the power source, and the first ejection seat subsystem may be located on the ejection seat. The first ejection seat subsystem may comprise at least one of a drogue parachute assembly, a main parachute assembly, a restraint release assembly, or an inertia reel assembly.

An ejection seat is also disclosed herein. In accordance with various embodiments, the ejection seat may comprise a power source and a sequencer electrically coupled to the power source. A first ejection seat subsystem may be in communication with the sequencer. A tangible, non-transitory computer-readable storage medium has instructions stored thereon that, in response to execution by the sequencer, cause the sequencer to perform operations, which may comprise: receiving, by the sequencer, a power input from the power source; sending, by the sequencer, a first deploy signal to a canopy removal system; sending, by the sequencer, a second deploy signal to an ejection seat catapult; and sending, by the sequencer, a third deploy signal to the first ejection seat subsystem.

In various embodiments, a test port may be electrically coupled to the sequencer. In various embodiments, a handle may be operably coupled to the power source. The power source may be configured to output the power input to the sequencer in response to actuation of the handle.

In various embodiments, the operations may further comprise determining, by the sequencer, a first electrical connector is disconnected from a second electrical connector; and sending, by the sequencer, the second deploy signal in response to determining the first electrical connector is disconnect from the second electrical connector. The first electrical connector may be electrically coupled to the canopy removal system and the second electrical connector may be electrically coupled to the sequencer.

In various embodiments, the sequencer may be configured to send the second deploy signal a predetermined time delay after sending the first deploy signal. In various embodiments, the first ejection seat subsystem may comprise at least one of a drogue parachute assembly, a main parachute assembly, a restraint release assembly, or an inertia reel assembly.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 1:
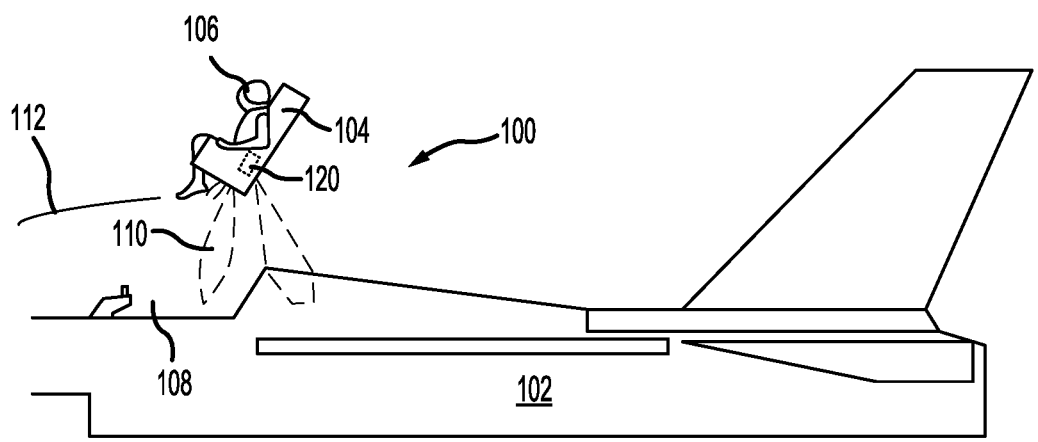
FIG. 1 illustrates an ejection seat being launched from an aircraft cockpit, in accordance with various embodiments.

Referring now to FIG. 1, an aircraft ejection system 100 is shown, in accordance with various embodiments. Ejection system 100 may be installed in aircraft 102 to safely expel an ejection seat 104 and an occupant 106 of ejection seat 104 from a cockpit 108 of aircraft 102. Ejection seat 104 may be urged from cockpit 108 by a propulsion system 110. Aircraft 102 may be a passenger aircraft, a cargo aircraft, a military aircraft, or the like. As described in further detail below, ejection system 100 includes an escape system and ejection seat (ESES) sequencer 120. ESES sequencer 120 is configured to control the timing (i.e., sequence) and deployment of the aircraft escape subsystems and the ejection seat subsystems of ejection system 100. The aircraft escape subsystems may include a subsystem associated with the removal of canopy 112 from over ejection seat 104 and a subsystem associated with the expulsion of ejection seat 104 from cockpit 108. The ejection seat subsystems are located on ejection seat 104 and are generally associated with controlling ejection seat 104 after ejection seat 104 is expelled from cockpit 108 and separating occupant 106 from ejection seat 104.

Figure 2A:
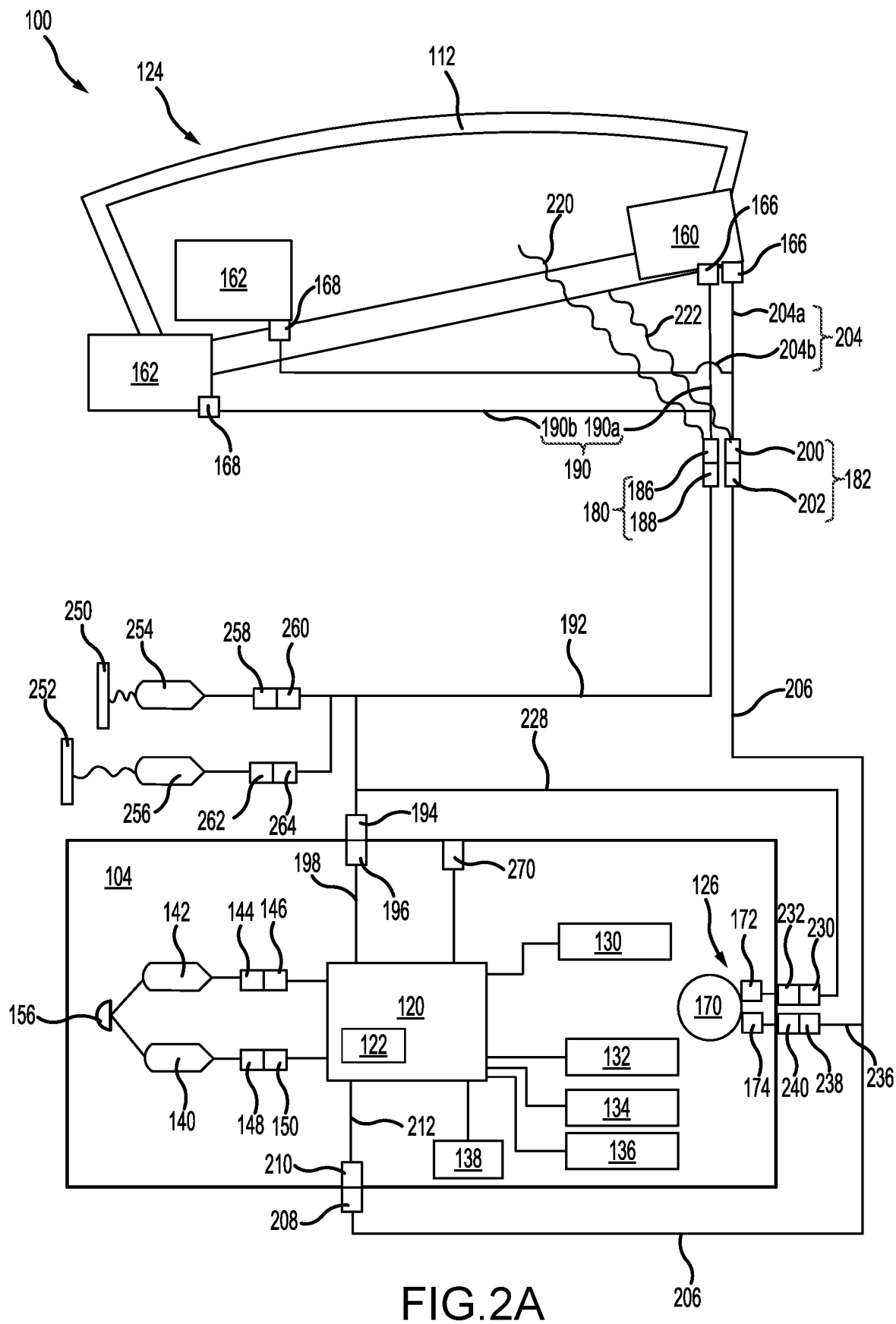
FIG. 2A illustrates a schematic of an ejection system, in accordance with various embodiments.

With reference to FIG. 2A, a schematic of ejection system 100 is illustrated. In accordance with various embodiments, ejection system 100 includes ESES sequencer 120. ESES sequencer 120 may be located on ejection seat 104. ESES sequencer 120 may include one or more logic devices such as one or more of a microcontroller unit (MCU) with embedded firmware, a central processing unit (CPU), an accelerated processing unit (APU), a digital signal processor (DSP), a field programmable gate array (FPGA), an application specific integrated circuit (ASIC), or the like. ESES sequencer 120 further includes any tangible, non-transitory computer-readable storage medium 122 known in the art. The storage medium 122 has instructions stored thereon for controlling the deployment of the aircraft escape and ejection seat subsystems of ejection system 100 and that, in response to execution by ESES sequencer 120, cause ESES sequencer 120 to perform various operations related to the deployment of the aircraft escape subsystems and the ejection seat subsystems. In accordance with various embodiments, the aircraft escape subsystems include a canopy removal system 124 configured to remove canopy 112 from over ejection seat 104 and a seat catapult system 126 configured to expel ejection seat 104 from the aircraft cockpit. In accordance with various embodiments, the ejection seat subsystems may include, for example, a main parachute assembly 130, a drogue parachute assembly 132, a restraint release assembly 134, a pitch stabilization package (STAPAC) 136, and/or an inertia reel assembly 138. In various embodiments, the ejection seat subsystems may further include an under-seat rocket motor assembly.

In accordance with various embodiments, ejection system 100 includes a first power source 140 and a second power source 142. Each of first power source 140 and second power source 142 are electrically coupled to ESES sequencer 120. For example, an electrical connector 144, which is electrically coupled to first power source 140, may engage (i.e. "mate with") an electrical connector 146 that is electrically coupled to ESES sequencer 120. As used herein, "engage" means to place into electrical communication. Similarly, an electrical connector 148, which is electrically coupled to second power source 142, may engage (i.e., "mate with") an electrical connector 150 that is electrically coupled to ESES sequencer 120. Second power source 142 may provide a redundancy to first power source 140. In this regard, should one of first power source 140 or second power source 142 fail, the other of first power source 140 and second power source 142 outputs power to ESES sequencer 120.

In accordance with various embodiments, first power source 140 and second power source 142 are configured to activate in response to initiation of an ejection sequence. For example, first power source 140 and second power source 142 may be activated in response to actuation of a handle 156 of ejection system 100. In various embodiments, first power source 140 and second power source 142 may activated by an initiator that fires in response to actuation of handle 156. Handle 156 may be located on ejection seat 104 such that handle 156 can be actuated (e.g., pulled) by an occupant of ejection seat 104. Actuation of handle 156 is configured to cause an initiation of the ejection sequence. Upon activation, first power source 140 and second power source 142 output power (e.g., current) to ESES sequencer 120. Stated differently, upon actuation of handle 156, ESES sequencer 120 receives a power input from first power source 140 and/or from second power source 142. In various embodiments, first power source 140 and second power source 142 may each comprise a thermal battery configured to activate in response to initiation of the ejection sequence (e.g., in response to actuation of handle 156). For example, initiation of the ejection sequence may cause a chemical reaction within the thermal battery. The chemical reaction generates electricity that is provided to ESES sequencer 120. In various embodiments, first power source 140 is a thermal battery and second power source 142 comprises an aircraft power switch configured to electrically connect ESES sequencer 120 to an aircraft power source in response to actuation of handle 156. In various embodiments, first power source 140 is a thermal battery and second power source 142 comprises a capacitor configured to be charged via aircraft power and provide current to ESES sequencer 120 in response to actuation of handle 156. Employing aircraft power to supply power to one of the power sources (e.g., second power source 142) tends to allow for quicker activation of ESES sequencer 120, as an aircraft power switch and/or a capacitor do not generally include the time delay associated with generating an electrical signal via the chemical reaction of a thermal battery.

In accordance with various embodiments, in response to receiving a power input from first power source 140 and/or second power source 142, ESES sequencer 120 begins deploying the various aircraft escape subsystems and ejection seat subsystems of the ejection system 100.

In accordance with various embodiments, ESES sequencer 120 controls the deployment of canopy removal system 124 and seat catapult system 126. In various embodiments, canopy removal system 124 is a canopy jettison system comprising a canopy unlock thruster 160 configured to unlock canopy 112 and one or more canopy jettison rockets 162 configured to propel canopy 112 away from the cockpit. In accordance with various embodiments, ESES sequencer 120 controls the deployment of canopy unlock thruster 160 and canopy jettison rockets 162 by outputting deploy signals (i.e., electrical signals) to one or more electronic-explosive device(s) (EED(s)) 166 operably connected to canopy unlock thruster 160 and to one or more EED(s) 168 operably connected to canopy jettison rockets 162. EEDs 166, 168 are configured to fire (e.g., ignite a propellant of the EED) in response to receiving the deploy signals from ESES sequencer 120. In response to EEDs 166 firing, canopy unlock thruster 160 unlocks canopy 112. For example, canopy unlock thruster 160 may translate canopy 112 in a forward or aft direction such that hooks attached to canopy 112 are located clear of tabs connected to the aircraft (i.e., such that the canopy hooks are aligned with openings between the tabs), thereby unlocking canopy 112 from the aircraft. In response to EEDs 168 firing, canopy jettison rockets 162 may fire, thereby expelling canopy 112 from over ejection seat 104. In accordance with various embodiments, ESES sequencer 120 is configured to control the sequence in which EEDs 166 and EEDs 168 fire such that canopy unlock thruster 160 will deploy and unlock canopy 112 prior to canopy jettison rockets 162 firing. For example, ESES sequencer may send a deployment signal to EEDs 168 a preset time delay after sending a deploy signal to EEDs 166.

In accordance with various embodiments, ESES sequencer 120 also controls the expulsion of ejection seat 104 from cockpit 108 by controlling when a seat catapult 170 of seat catapult system 126 fires (i.e., deploys). Seat catapult system 126 may include propulsion system 110 in FIG. 1. In various embodiments, ESES sequencer 120 fires the seat catapult 170 by outputting deploy signals (i.e., electrical signals) to one or more EED(s), such as EED 172 and EED 174, operably coupled to seat catapult 170. EEDs 172, 174 are configured to fire (e.g., a propellant of the EED ignites) in response to receiving the deploy signal from ESES sequencer 120. In response to EEDs 172, 174 firing, seat catapult 170 may fire, thereby expelling ejection seat 104 from the cockpit. In accordance with various embodiments, ESES sequencer 120 is configured to control the sequence in which EEDs 168 of canopy removal system 124 and EEDs 172, 174 of seat catapult system 126 fire, such that canopy jettison rockets 162 will fire prior to seat catapult 170.

In various embodiments, one or more electrical disconnects, such as electrical disconnect 180 and electrical disconnect 182, are coupled between ESES sequencer 120 and canopy removal system 124. Electrical disconnect 180 may include an electrical connector 186 and an electrical connector 188. Electrical connector 186 is electrically coupled to a wire bundle 190. A first set of wires 190a of wire bundle 190 is electrically coupled to at least one EED 166. A second set of wires 190b of wire bundle 190 is electrically connected to at least one EED 168. Electrical connector 188 is electrically coupled to a wire bundle 192. Electrical connector 186 is configured to engage electrical connector 188, thereby electrically coupling one or more wires of wire bundle 190 to one or more wires of wire bundle 192. Wire bundle 192 is electrically connected to an electrical connector 194. Electrical connector 194 is configured to engage an electrical connector 196 that is electrically connected to ESES sequencer 120. Electrical connector 196 may be electrically coupled to ESES sequencer 120 via a wire bundle 198. In this regard, wire bundle 192 may be electrically coupled to wire bundle 198 and ESES sequencer 120 by engaging (i.e., mating) electrical connector 194 with electrical connector 196. Electrical connector 196 may be located on ejection seat 104.

Electrical disconnect 182 may include an electrical connector 200 and an electrical connector 202. Electrical connector 200 is electrically coupled to a wire bundle 204. Stated differently, wire bundle 204 includes electrical connector 200. In various embodiments, a first set of wires 204a of wire bundle 204 is electrically coupled to at least one EED 166. A second set of wires 204b of wire bundle 204 is electrically connected to at least one EED 168. Electrical connector 202 is electrically coupled to a wire bundle 206. Stated differently, wire bundle 206 includes electrical connector 202. Electrical connector 200 is configured to engage electrical connector 202, thereby electrically coupling one or more wires of wire bundle 204 to one or more wires of wire bundle 206. Wire bundle 206 may also include an electrical connector 208. Electrical connector 208 is configured to engage an electrical connector 210 that is electrically connected to ESES sequencer 120. Electrical connector 210 may be electrically coupled to ESES sequencer 120 via a wire bundle 212. In this regard, wire bundle 206 may be electrically coupled to wire bundle 212 and ESES sequencer 120 by engaging (i.e., "mating") electrical connector 208 with electrical connector 210. Electrical connector 210 may be located on ejection seat 104. Wire bundles 204, 206, 212 and electrical connectors 200, 202, 208, 210 may provide a redundancy in ejection system 100. In this regard, should one of wire bundle 190, wire bundle 192, or wire bundle 198 or electrical connector 186, electrical connector 188, electrical connector 194, or electrical connector 196 fail, wire bundles 204, 206, 212 and electrical connectors 200, 202, 208, 210 will provide electrical connection between ESES sequencer 120 and canopy removal system 124.

In various embodiments, a lanyard 220 may be connected between canopy 112 and electrical connector 186. A lanyard 222 may be connected between canopy 112 and electrical connector 200. Lanyard 220 is configured to disconnect electrical connector 186 from electrical connector 188, in response to removal of canopy 112 from over ejection seat 104. Similarly, lanyard 222 is configured to disconnect electrical connector 200 from electrical connector 202, in response to removal of canopy 112 from over ejection seat 104. For example, the length of lanyards 220, 222 and/or the connection location of lanyards 220, 222 on canopy 112 is/are selected such that lanyards 220, 222 will translate (i.e., pull) electrical connectors 186, 200 away from electrical connectors 188, 200, respectively, in response to canopy 112 translating a threshold distance away from the cockpit and/or in response to canopy 112 translating beyond a threshold angle.

In accordance with various embodiments, electrical disconnects 180, 182 are configured such that ESES sequencer 120 can determine when electrical connector 186 has been disconnected from electrical connector 188 and electrical connector 200 has been disconnected from electrical connector 202. In accordance with various embodiments, ESES sequencer 120 is configured to send the deploy signal to seat catapult system 126 after determining electrical connectors 188, 200 are disconnected from electrical connectors 186, 200, respectively (i.e., in response to lanyards 220, 222 disconnecting electrical connectors 186, 200 from electrical connectors 188, 202, respectively). For example, ESES sequencer 120 is configured to determine the circuit formed between electrical connector 186 and electrical connector 188 is broken (or "open"). Similarly, ESES sequencer 120 is configured to determine if the circuit formed between electrical connector 200 and electrical connector 202 is broken (or "open"). In accordance with various embodiments, ESES sequencer 120 sends deploy signals to EED 172 and EED 174 in response to determining that electrical connector 188 is disconnected from electrical connector 186 and/or that electrical connector 200 is disconnected from electrical connector 202. Electrical disconnects 180, 182 thus allow ESES sequencer 120 to control the sequence in which EEDs 168 and EEDs 172, 174 are fired, such that seat catapult 170 does not fire until canopy jettison rockets 162 have fired and canopy 112 has been displaced from over ejection seat 104.

Figure 2B:
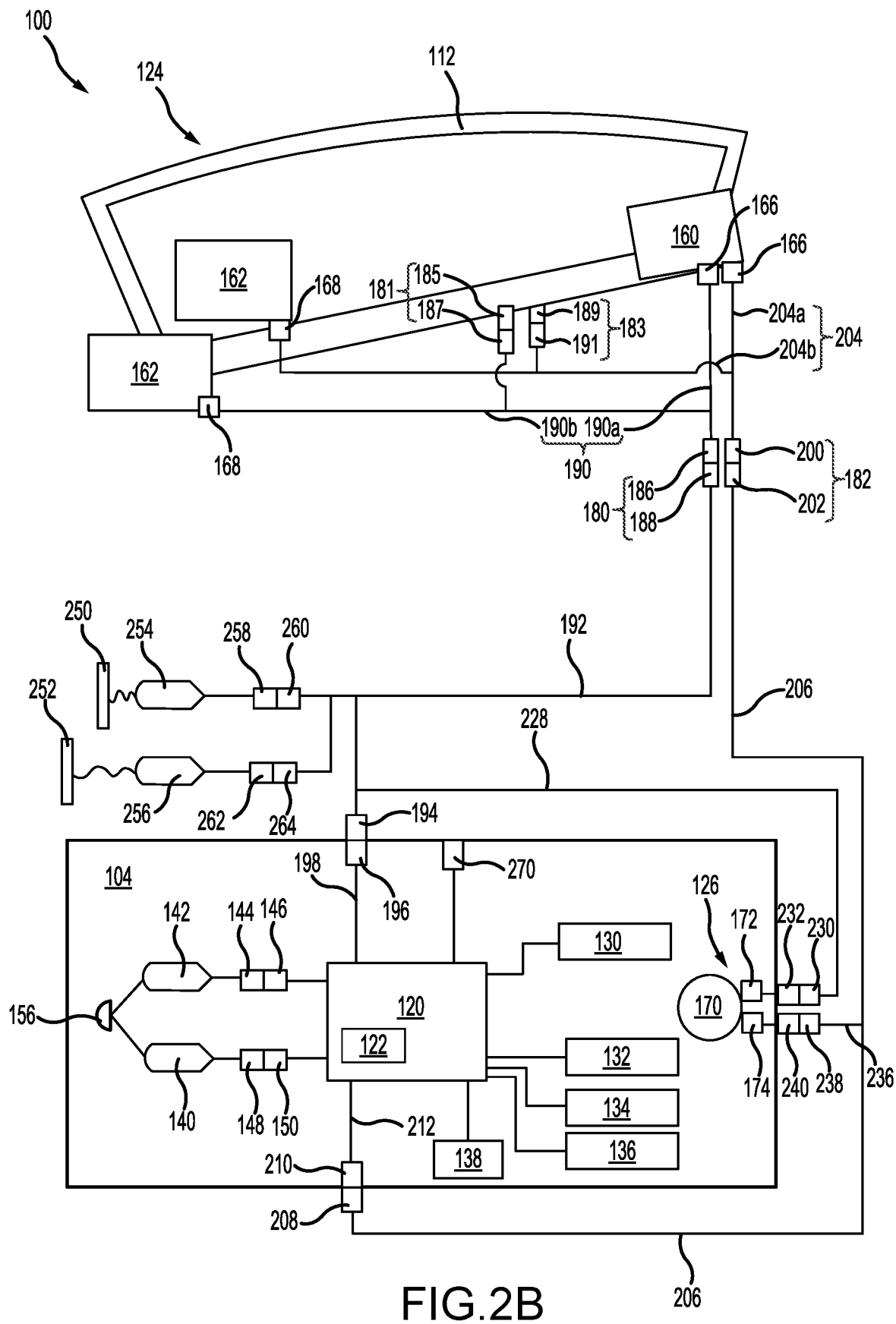
FIG. 2B illustrates a schematic of an ejection system having dedicated canopy disconnects, in accordance with various embodiments.

With momentary reference to FIG. 2B, in various embodiments, canopy removal system 124 may include one or more canopy disconnects, such as canopy disconnect 181 and canopy disconnect 183, located between canopy 112 and ESES sequencer 120. In various embodiments, canopy disconnect 181 may be located between canopy 112 and electrical disconnect 180. In various embodiments, canopy disconnect 181 may be electrically coupled to wire bundle 190. In various embodiments, canopy disconnect 183 may be located between canopy 112 and electrical disconnect 182. In various embodiments, canopy disconnect 183 may be electrically coupled to wire bundle 204.

Canopy disconnect 181 includes a first portion 185 and a second portion 187. Canopy disconnect 183 includes a first portion 189 and a second portion 191. First portions 185, 189 are configured to disconnect from second portions 187, 191, respectively, in response to removal of canopy 112 from over ejection seat 104. For example, first portions 185, 189 disconnect from second portions 187, 191, respectively, in response to canopy 112 translating a threshold distance away from the cockpit and/or in response to canopy 112 translating beyond a threshold angle.

In accordance with various embodiments, canopy disconnects 181, 183 are configured such that ESES sequencer 120 can determine when first portions 185, 189 have disconnected from second portions 187, 191, respectively. In accordance with various embodiments, ESES sequencer 120 may be configured to send the deploy signal to seat catapult system 126 after determining first portions 185, 189 have disconnected from second portions 187, 191, respectively. For example, first portion 185 and second portion 187 of canopy disconnect 181 may form a circuit when connected to one another, and ESES sequencer 120 may be configured to determine, or recognize, when the circuit formed between first portion 185 and second portion 187 is broken (or "open"). Similarly, first portion 189 and second portion 191 of canopy disconnect 183 may form a circuit when connected to one another, and ESES sequencer 120 may be configured to determine, or recognize, when the circuit formed between first portion 189 and second portion 191 is broken (or "open"). In accordance with various embodiments, ESES sequencer 120 is configured to send the deploy signals to EED 172 and EED 174 in response to determining that the canopy disconnects 181, 183 are disconnected (i.e., in response to determining that second portions 187, 191 have disconnected from first portions 185, 189). Canopy disconnects 181, 183 allow ESES sequencer 120 to control the sequence in which EEDs 168 and EEDs 172, 174 are fired, such that seat catapult 170 does not fire until canopy jettison rockets 162 have fired and canopy 112 has been displaced from over ejection seat 104.

Returning to FIG. 2A, in accordance with various embodiments, ESES sequencer 120 may send deploy signals to EED 172 via one or more wire(s) 228 electrically coupled to electrical connector 194. Wire(s) 228 are connected to an electrical connector 230. Electrical connector 230 is configured to engage an electrical connector 232. Electrical connector 232 is electrically coupled to EED 172 and may be located proximate seat catapult 170. ESES sequencer 120 may send deploy signals to EED 174 via one or more wire(s) 236 electrically coupled to wire bundle 206 and electrical connector 208. Wire(s) 236 are connected to an electrical connector 238. Electrical connector 238 is configured to engage an electrical connector 240. Electrical connector 240 is electrically coupled to EED 174 and may be located proximate seat catapult 170.

In various embodiments, ejection system 100 may also include an external canopy release handle 250 and an internal canopy release handle 252. External canopy release handle 250 is located outside cockpit 108, with momentary reference to FIG. 1, and is configured to allow emergency or maintenance personnel to deploy canopy removal system 124 and remove canopy 112 from over ejection seat 104 if, for example, occupant 106 is unconscious. Internal canopy release handle 252 is located inside cockpit 108 and is configured to allow occupant 106 to deploy canopy removal system 124 and remove canopy 112 from over ejection seat 104 without expelling ejection seat 104 (i.e., without deploying seat catapult system 126 and the ejection seat subsystems).

External canopy release handle 250 is operably coupled to a power source 254. Internal canopy release handle 252 is operably coupled to a power source 256. Power source 254 is configured to activate in response to actuation of external canopy release handle 250. Power source 256 is configured to activate in response to actuation of internal canopy release handle 252. Upon activation, power sources 254, 256 provide electricity (e.g., current) to wire bundle 192. In various embodiments, power source 254 and power source 256 may each comprise a thermal battery configured to activate in response to actuation of their respective canopy release handle. Power sources 254, 256 are electrically coupled to one or more wires of wire bundle 192. For example, an electrical connector 258, which is electrically coupled to power source 254, is configured to engage an electrical connector 260 that is electrically coupled to wire bundle 192 and electrical connector 188. In this regard, electrical connectors 258 and 260, electrical connectors 188 and 186, and wire bundles 192 and 190 are configured to electrically connect power source 254 to EEDs 166, 168. Similarly, an electrical connector 262, which is electrically coupled to power source 256, engages an electrical connector 264 that is electrically coupled to wire bundle 192 and electrical connector 188. Thus, electrical connectors 262 and 264, electrical connectors 188 and 186, and wire bundles 192 and 190 electrically connect power source 256 to EEDs 166, 168.

In accordance with various embodiments, ESES sequencer 120 is configured to control the deployment sequence of the ejection seat subsystems. After deploying seat catapult 170, ESES sequencer 120 may send a deploy signal to a drogue parachute assembly 132 of ejection system 100. Drogue parachute assembly is located on ejection seat 104. In response to receiving the deploy signal from ESES sequencer 120, one or more drogue parachute mortars and/or other deployment components of drogue parachute assembly 132 may fire to deploy a drogue parachute connected to ejection seat 104.

In various embodiments, ESES sequencer 120 may send a deploy signal to a main parachute assembly 130 of ejection system 100. Main parachute assembly 130 is located on ejection seat 104. In response to receiving the deploy signal from ESES sequencer 120, one or more parachute mortars and/or other deployment components of main parachute assembly 130 may fire to deploy a main parachute coupled to the seat occupant.

In various embodiments, ESES sequencer 120 may send a deploy signal to a restraint release assembly 134 of ejection system 100. Restraint release assembly 134 is located on ejection seat 104. In response to receiving the deploy signal from ESES sequencer 120, one or more EEDs, thrusters, cutters, and/or other deployment components of restraint release assembly 134 may fire to release the occupant from ejection seat 104.

In various embodiments, ESES sequencer 120 may send a deploy signal to STAPAC assembly 136 of ejection system 100. STAPAC assembly 136 is located on ejection seat 104. In response to receiving the deploy signal from ESES sequencer 120, one or more EEDs, thrusters, rockets, and/or other deployment components of STAPAC assembly 136 may fire to control the pitch of ejection seat 104. In various embodiments, ESES sequencer may send a deploy signal to an under-seat rocket assembly located on ejection seat 104.

In various embodiments, ESES sequencer 120 may send a deploy signal to inertia reel assembly 138 of ejection system 100. Inertia reel assembly 138 is located on ejection seat 104. In response to receiving the deploy signal from ESES sequencer 120, one or more EEDs, thrusters, cutters, actuators, and/or other components of inertia reel assembly 138 may fire to remove the occupant shoulder harness or otherwise release the occupant from ejection seat 104.

Configuring ESES sequencer 120 to electrically connect to and control the ejection seat subsystems (e.g., main parachute assembly 130, drogue parachute assembly 132, restraint release assembly 134, STAPAC assembly 136, and inertia reel assembly 138) and the aircraft escape subsystems (e.g., canopy removal system 124 and seat catapult system 126) allows ejection system 100 to operate with one sequencer located on the ejection seat 104. In this regard, ESES sequencer 120 allows for ejection systems, which do not include a separate sequencer located on the aircraft. Eliminating the aircraft sequencer tends to reduce ejection system weight, part count, and costs. In addition, connecting the subsystems to a single sequencer improves reliability and may allow for simpler installation and/or decreased assembly times.

In various embodiments, ejection system 100 may include a test port 270 electrically connected to ESES sequencer 120. Test port 270 may be an electrical connector located on ejection seat 104. Test port 270 is configured to engage an electrical connecter of a testing module (e.g., an electrical cord connected to a laptop, a tablet, an electronic test seat, or any component capable of running testing software). ESES sequencer 120 is configured to operate in a test mode in response to the testing module being electrically connected to test port 270. For example, in test mode, the EEDs of ejection system 100 do not fire. The testing module when connected to test port 270 may verify the functionality of the microcontrollers and the sequencer logic of ESES sequencer 120 and/or may run a low voltage through the pins of the electrical connectors and thru the wires bundles to determine that ESES sequencer 120 and ejection system 100 is properly assembled and that there is electric continuity between the electrical connectors and other circuitry of ejection system 100.

Figure 3:
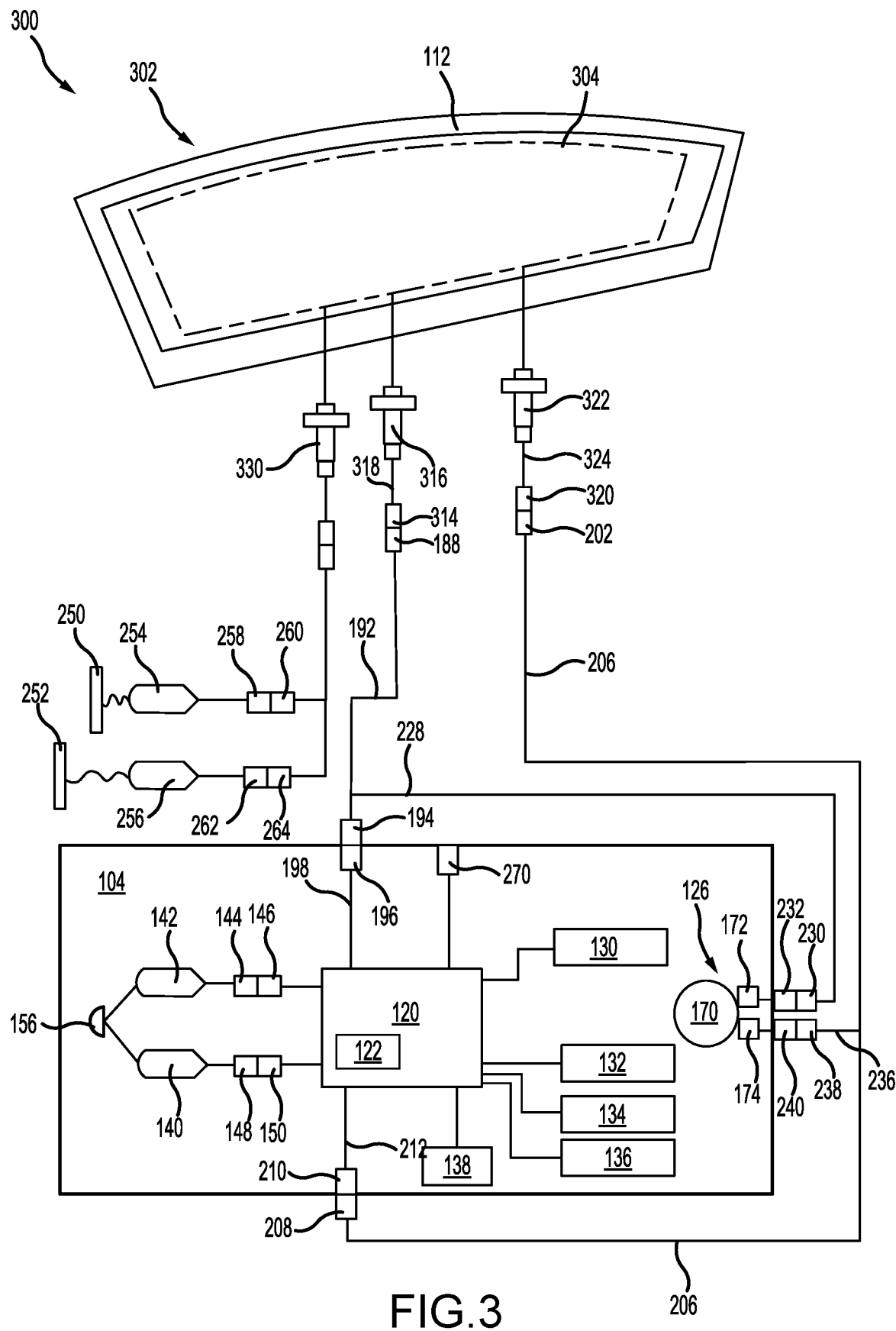
FIG. 3 illustrates a schematic of an ejection system, wherein the canopy removal system includes a canopy breaking system, in accordance with various embodiments.

With reference to FIG. 3, a schematic of an ejection system 300 is illustrated. Ejection system 300 may be installed in aircraft 102, with momentary reference to FIG. 1, in place of ejection system 100. Ejection system 300 is similar to ejection system 100 in FIG. 2A. Accordingly, in FIG. 3, elements with like element numbering, as depicted in FIG. 2A, are intended to be the same and will not necessarily be repeated for the sake of clarity.

In accordance with various embodiments, ejection system 300 may include a canopy removal system 302 in place of canopy removal system 124 in FIG. 2A. In various embodiments, canopy removal system 302 comprises a canopy breaking system (e.g., a canopy severance system, a canopy fracture system, or any system wherein canopy 112 is removed by breaking, at least, a portion of the canopy 112 located over ejection seat 104). Canopy removal system 302 includes a detonating cord 304 configured to sever or fracture canopy 112, thereby removing or weakening canopy 112 over the ejection seat 104.

In accordance with various embodiments, an electrical connector 314, which is electrically coupled to a detonator 316 of canopy removal system 302, engages electrical connector 188, thereby electrically connecting detonator 316 to ESES sequencer 120. Electrical connector 314 may be coupled to detonator 316 via a wire bundle 318. Detonator 316 is operably coupled to detonating cord 304. In response to receiving a deploy signal (e.g., an electrical signal) from ESES sequencer 120, detonator 316 fires, thereby causing detonating cord 304 to sever or fracture canopy 112. Electrical connector 314 is configured to engage electrical connector 188, thereby electrically coupling one or more wires of wire bundle 192 to wire bundle 318.

In accordance with various embodiments, an electrical connector 320, which is electrically coupled to a detonator 322 of canopy removal system 302, engages electrical connector 202, thereby electrically connecting detonator 322 to ESES sequencer 120. Electrical connector 320 may be coupled to detonator 322 via a wire bundle 324. Detonator 322 is operably coupled to detonating cord 304. In response to receiving a deploy signal (e.g., an electrical signal) from ESES sequencer 120, detonator 322 fires, thereby causing detonating cord 304 to sever or fracture canopy 112. Electrical connector 320 is configured to engage electrical connector 202, thereby electrically coupling one or more wires of wire bundle 206 to wire bundle 324.

In various embodiments, ESES sequencer 120 may be configured to send the deploy signals to EEDs 172, 174 a preset time delay (e.g., 0.1 seconds, 0.2 seconds, 0.3 seconds, etc.) after sending the deploy signals to detonators 316, 322. In various embodiments, the distance between ejection seat 104 and canopy 112 may be such (i.e., great enough) that ESES sequencer 120 sends the deploy signals to detonators 316, 322 prior to, or simultaneously with, the deploy signals sent to EEDs 172, 174. After deploying seat catapult system 126 and canopy removal system 302, ESES sequencer 120 deploys the ejection seat subsystems (e.g., main parachute assembly 130, drogue parachute assembly 132, restraint release assembly 134, STAPAC assembly 136, and inertia reel assembly 138).

Configuring ESES sequencer 120 to electrically connect to and control the ejection seat subsystems (e.g., main parachute assembly 130, drogue parachute assembly 132, restraint release assembly 134, STAPAC assembly 136, and inertia reel assembly 138) and the aircraft escape subsystems (e.g., canopy removal system 302 and seat catapult system 126) allows ejection system 300 to operate with one sequencer located on the ejection seat 104. In this regard, ESES sequencer 120 allows for ejection systems, which do not include a separate sequencer located on the aircraft. Eliminating the aircraft sequencer tends to reduce ejection system weight, part count, and costs. In addition, connecting the subsystems to a single sequencer improves the reliability and may allow for simpler installation and/or decreased assembly times.

In various embodiments, power source 254 and power source 256 may be electrically coupled to a detonator 330 of canopy removal system 302. Detonator 330 is operably coupled to detonating cord 304. In response to receiving a deploy signal (e.g., an electrical signal) from power source 254 or power source 256, detonator 330 fires, thereby causing detonating cord 304 to sever or fracture canopy 112.

Figure 4:
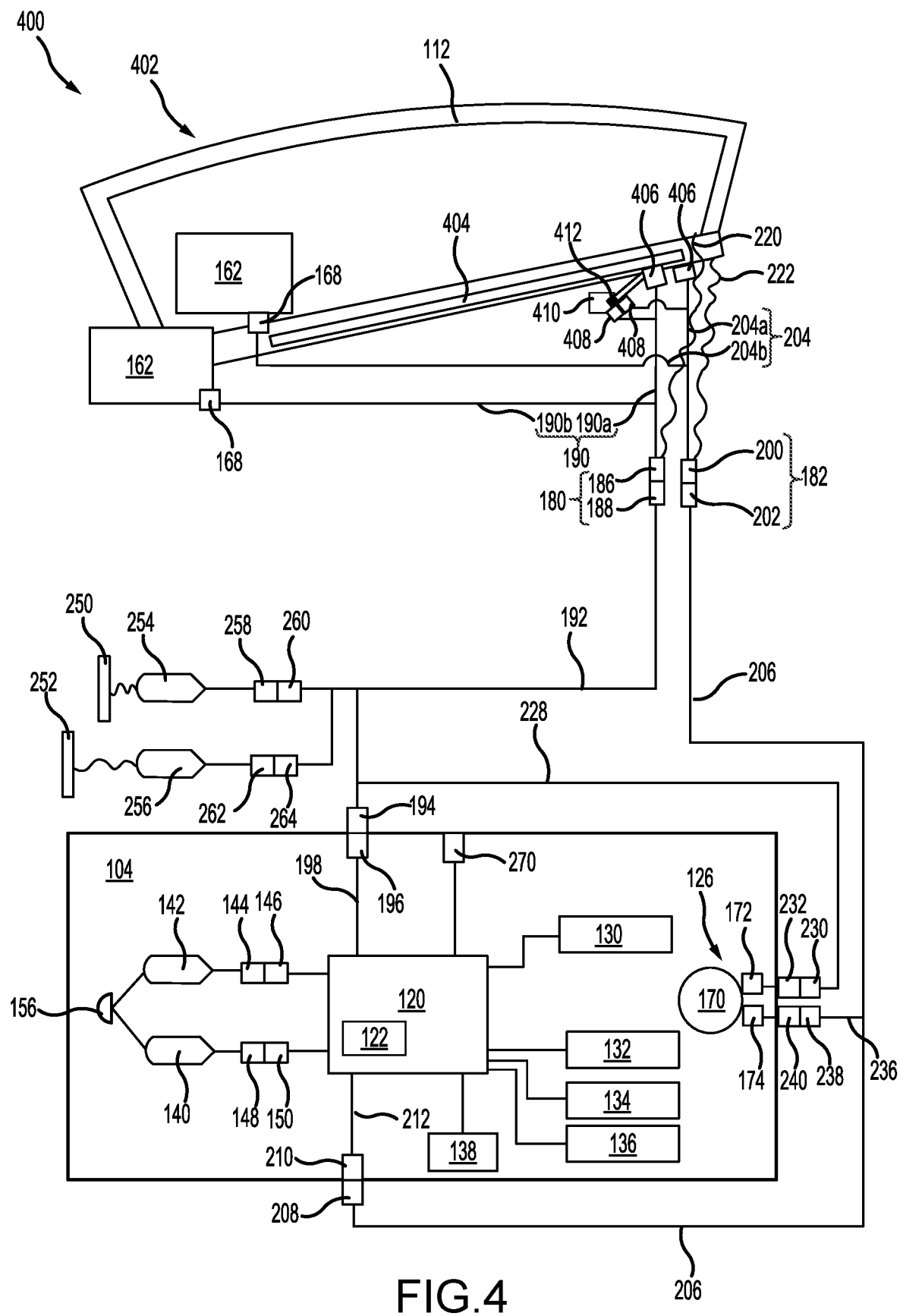
FIG. 4 illustrates a schematic an ejection system, wherein the canopy removal system includes an emergency canopy release line, in accordance with various embodiments.

With reference to FIG. 4, a schematic of an ejection system 400 is illustrated. Ejection system 400 may be installed in aircraft 102, with momentary reference to FIG. 1, in place of ejection system 100. Ejection system 400 is similar to ejection system 100 in FIG. 2A. Accordingly, in FIG. 4, elements with like element numbering, as depicted in FIG. 2A, are intended to be the same and will not necessarily be repeated for the sake of clarity.

In accordance with various embodiments, ejection system 400 may include a canopy removal system 402 in place of canopy removal system 124 in FIG. 2A. In various embodiments, canopy removal system 402 comprises a canopy jettison system comprising an emergency canopy release line (ECRL) 404 configured to detonate and unlock canopy 112 by shearing the locks between canopy 112 and the aircraft. Canopy removal system 402 further comprises one or more canopy jettison rockets 162 configured to propel canopy 112 away from the cockpit. In accordance with various embodiments, ESES sequencer 120 controls the deployment of ECRL 404 and canopy jettison rockets 162 by outputting deploy signals (i.e., electrical signals) to one or more detonators 406 operably connected to ECRL 404 and to the EEDs 168 operably coupled to canopy jettison rockets 162. In various embodiments, ESES sequencer 120 may also send a deploy signal to one or more detonators 408 configured to separate the canopy 112 from the canopy lift motor 410. For example, detonators 408 may be configured to disconnect the canopy lift motor 410 by breaking (i.e., detonating) a bolt 412 that couples the canopy lift motor 410 to the canopy 112. Breaking bolt 412 allows canopy 112 to separate from the canopy lift motor 410 so that canopy 112 may be jettisoned from the aircraft.

In accordance with various embodiments, ESES sequencer 120 is configured to control the sequence in which detonators 406, detonators 408, and EEDs 168 fire such that ECRL 404 will fire and unlock canopy 112 prior to canopy jettison rockets 162 firing. For example, ESES sequencer 120 may send a deploy signal to EEDs 168 a preset time delay after sending a deploy signal to detonators 406. ESES sequencer 120 may be configured to send the deploy signal to seat catapult system 126 in response to determining electrical connectors 186, 200, which are connected to canopy 112 via lanyards 220, 222, have separated from electrical connectors 188, 202, respectively. In various embodiments, canopy removal system 402 may include canopy disconnects, similar to canopy disconnects 181, 183 in FIG. 2B. ESES sequencer 120 is configured to deploy the ejection seat subsystems (e.g., main parachute assembly 130, drogue parachute assembly 132, restraint release assembly 134, STAPAC assembly 136, and inertia reel assembly 138) after deploying seat catapult system 126.

Configuring ESES sequencer 120 to electrically connect to and control the ejection seat subsystems (e.g., main parachute assembly 130, drogue parachute assembly 132, restraint release assembly 134, STAPAC assembly 136, and inertia reel assembly 138) and the aircraft escape subsystems (e.g., canopy removal system 402 and seat catapult system 126) allows ejection system 400 to operate with one sequencer located on the ejection seat 104. In this regard, ESES sequencer 120 allows for ejection systems, which do not include a separate sequencer located on the aircraft. Eliminating the aircraft sequencer tends to reduce ejection system weight, part count, and costs. In addition, connecting the subsystems to a single sequencer improves reliability and may allow for simpler installation and/or decreased assembly times.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An article of manufacture including a tangible, non-transitory computer-readable storage medium having instructions stored thereon for controlling deployment of aircraft escape and ejection seat subsystems and that, in response to execution by a sequencer, cause the sequencer to perform operations comprising:
   receiving, by the sequencer, a power input, the power input provided from a power source that is activated in response to actuation of a handle;
   sending, by the sequencer, a first deploy signal to a first aircraft escape subsystem; and
   sending, by the sequencer, a second deploy signal to a first ejection seat subsystem.

2. The article of claim 1, wherein the first aircraft escape subsystem comprises at least one of a canopy removal system or a seat catapult system.

3. The article of claim 2, wherein the first ejection seat subsystem comprises at least one of a drogue parachute assembly, a main parachute assembly, a restraint release assembly, or an inertia reel assembly.

4. The article of claim 1, wherein the operations further comprise sending, by the sequencer, a third deploy signal to a second aircraft escape subsystem, wherein the first aircraft escape subsystem comprises a canopy removal system and the second aircraft escape subsystem comprises a seat catapult system.

5. The article of claim 4, wherein the operations further comprise:
   determining, by the sequencer, a first electrical connector is disconnected from a second electrical connector, wherein the first electrical connector is electrically coupled to the canopy removal system and the second electrical connector is electrically coupled to the sequencer; and
   sending, by the sequencer, the third deploy signal in response to determining the first electrical connector is disconnected from the second electrical connector.

6. The article of claim 4, wherein the sequencer is configured to send the third deploy signal to the seat catapult system a predetermined time delay after sending the first deploy signal to the canopy removal system.

7. The article of claim 4, wherein the operations further comprise sending, by the sequencer, a fourth deploy signal to a second ejection seat subsystem after sending the second deploy signal, wherein the sequencer is configured to send the second deploy signal after sending the third deploy signal and determining.

8. The article of claim 1, wherein the handle is actuated in response to initiation of an ejection sequence.

9. An ejection system, comprising:
   a sequencer;
   a canopy removal system in communication with the sequencer;
   a power source electrically coupled to the sequencer;
   a handle coupled to the power source, the power source being activated to provide a power input to the sequencer in response to actuation of the handle;
   a seat catapult system in communication with the sequencer;
   a first ejection seat subsystem in communication with the sequencer; and
   a tangible, non-transitory computer-readable storage medium having instructions stored thereon that, in response to execution by the sequencer, cause the sequencer to perform operations comprising:
      receiving, by the sequencer, the power input from the power source;
      sending, by the sequencer, a first deploy signal to the canopy removal system;
      sending, by the sequencer, a second deploy signal to the seat catapult system; and sending, by the sequencer, a third deploy signal to the first ejection seat subsystem.

10. The ejection system of claim 9, further comprising:
a first wire bundle electrically coupled to the canopy removal system; and
a second wire bundle electrically coupled to the sequencer.

11. The ejection system of claim 10, wherein the operations further comprise:
determining, by the sequencer, a first electrical connector of the first wire bundle is disconnected from a second electrical connector of the second wire bundle; and
sending, by the sequencer, the second deploy signal in response to determining the first electrical connector is disconnected from the second electrical connector.

12. The ejection system of claim 9, further comprising a test port electrically coupled to the sequencer.

13. The ejection system of claim 12, wherein the sequencer is configured to send the second deploy signal a preset time delay after sending the first deploy signal to the canopy removal system.

14. The ejection system of claim 9, further comprising an ejection seat, wherein the sequencer, the power source, and the first ejection seat subsystem are located on the ejection seat, and wherein the first ejection seat subsystem comprises at least one of a drogue parachute assembly, a main parachute assembly, a restraint release assembly, or an inertia reel assembly.

15. An ejection seat, comprising:
a power source;
a sequencer electrically coupled to the power source;
a first ejection seat subsystem in communication with the sequencer; and
a tangible, non-transitory computer-readable storage medium having instructions stored thereon that, in response to execution by the sequencer, cause the sequencer to perform operations comprising:
receiving, by the sequencer, a power input from the power source;
sending, by the sequencer, a first deploy signal to a canopy removal system;
sending, by the sequencer, a second deploy signal to an ejection seat catapult; and
sending, by the sequencer, a third deploy signal to the first ejection seat subsystem.

16. The ejection seat of claim 15, further comprising a test port electrically coupled to the sequencer.

17. The ejection seat of claim 15, wherein the operations further comprise:
determining, by the sequencer, a first electrical connector is disconnected from a second electrical connector, wherein the first electrical connector is electrically coupled to the canopy removal system and the second electrical connector is electrically coupled to the sequencer; and
sending, by the sequencer, the second deploy signal in response to determining the first electrical connector is disconnect from the second electrical connector.

18. The ejection seat of claim 15, wherein the sequencer is configured to send the second deploy signal a predetermined time delay after sending the first deploy signal.

19. The ejection seat of claim 15, further comprising a handle operably coupled to the power source, wherein the power source is configured to output the power input to the sequencer in response to actuation of the handle.

20. The ejection seat of claim 15, wherein the first ejection seat subsystem comprises at least one of a drogue parachute assembly, a main parachute assembly, a restraint release assembly, or an inertia reel assembly.

* * * * *